United States Patent
Huang et al.

(10) Patent No.: US 6,832,269 B2
(45) Date of Patent: Dec. 14, 2004

(54) APPARATUS AND METHOD FOR SUPPORTING MULTIPLE GRAPHICS ADAPTERS IN A COMPUTER SYSTEM

(75) Inventors: Powei Huang, Hsinchu (TW); Jen-Min Yuan, Taichung (TW); Kuo-wei Yeh, Miaoli (TW)

(73) Assignee: Silicon Integrated Systems Corp., Hsin-Chu (TW)

( * ) Notice: Subject to any disclaimer, the term of this patent is extended or adjusted under 35 U.S.C. 154(b) by 399 days.

(21) Appl. No.: 10/035,253

(22) Filed: Jan. 4, 2002

(65) Prior Publication Data

US 2003/0131178 A1 Jul. 10, 2003

(51) Int. Cl.⁷ .......................... G06F 13/14; G06F 13/00
(52) U.S. Cl. .......................... 710/11; 710/72; 710/16; 710/305; 710/306
(58) Field of Search .......................... 710/62–74, 8–19, 710/305–315

(56) References Cited

U.S. PATENT DOCUMENTS

| | | | | |
|---|---|---|---|---|
| 5,905,509 A | * | 5/1999 | Jones et al. ................. | 345/520 |
| 6,067,098 A | * | 5/2000 | Dye .......................... | 345/531 |
| 6,141,021 A | * | 10/2000 | Bickford et al. ............ | 345/503 |
| 6,292,859 B1 | * | 9/2001 | Santiago .................... | 710/107 |
| 6,532,019 B1 | * | 3/2003 | Gulick et al. ............... | 345/519 |
| 6,557,065 B1 | * | 4/2003 | Peleg et al. ................. | 710/300 |
| 6,624,817 B1 | * | 9/2003 | Langendorf ................. | 345/520 |
| 6,633,296 B1 | * | 10/2003 | Laksono et al. ............ | 345/502 |
| 6,678,780 B1 | * | 1/2004 | Caruk et al. ................ | 710/306 |
| 6,693,558 B2 | * | 2/2004 | Hedrick ...................... | 340/971 |
| 6,724,389 B1 | * | 4/2004 | Wilen et al. ................ | 345/520 |
| 2002/0180725 A1 | * | 12/2002 | Simmonds et al. ......... | 345/213 |
| 2002/0186218 A1 | * | 12/2002 | Alben et al. ................ | 345/440 |
| 2003/0037335 A1 | * | 2/2003 | Gatto et al. .................. | 725/86 |

FOREIGN PATENT DOCUMENTS

JP  2001005772 A  1/2001

* cited by examiner

Primary Examiner—Sumati Lefkowitz
(74) Attorney, Agent, or Firm—Birch, Stewart, Kolasch & Birch, LLP

(57) ABSTRACT

An apparatus and a method for supporting coexistence of an external AGP graphics adapter with an embedded graphics adapter. The embedded graphics adapter may be regarded as a PCI device, and the graphics memory of embedded graphics adapter is integrated into DRAM of a computer system. The corelogic and software capable of graphics address remapping and directed accessing graphics memory of the embedded graphics adapter for supporting external AGP graphics adapter and embedded graphics adapter respectively. The embedded graphics adapter could be an AGP device while the external graphics adapter would be a PCI device, and vice versa.

17 Claims, 9 Drawing Sheets

APPARATUS AND METHOD FOR SUPPORTING MULTIPLE GRAPHICS ADAPTERS IN A COMPUTER SYSTEM

BACKGROUND OF THE INVENTION

1. Field of the Invention

The invention relates to an apparatus and a method concerning graphics processing in a computer system, and more particularly to an apparatus for supporting dual graphics adapters and method thereof.

2. Description of the Related Art

Computers have become of much more use in many activities with the advent of computer graphics displays which allow the presentation of not only numbers and text materials but pictures and graphs representing the meanings of those numbers and adding to the meaning of the text material.

Referring FIG. 1, in a conventional computer system, drawing work is sent from CPU 2 to an external graphics adapter 4 through chipset 1 and Accelerated Graphics Port (AGP) or Peripheral Component Interconnect (PCI) buses. The external graphics adapter 4 has an external graphics accelerator 41 for processing 2D and 3D graphics, and a local memory 42 acting as the graphics memory, or the video memory, of the graphics adapter 4. This graphics architecture reduces the overload of the processing recourse in CPU 2, which could be more concentrated on other matters except drawing pictures.

Nevertheless, because of progress in semiconductor manufacturing technology, it is a trend that the graphics adapter is embedded within an integrated chipset, and the local memory 42 is integrated into conventional system memory using the so-called Unified Memory Architecture (UMA). Therefore, referring to FIG. 2, drawing work is directly sent to the embedded graphics adapter 6 in the integrated chipset 6. The embedded graphics adapter 6 processes drawing works as the aforesaid external graphics adapter did. This integration dramatically reduces cost of a computer system as well as satisfies general users' demand, because users do not have to spend extra cost to purchase a graphics card comprising an additional graphics adapter in their computers.

However, this integration is not reasonable and acceptable for a user who wants a the-state-of-the-art graphics accelerator, which processes 3D pictures faster, to play 3D games or to run 3D graphics programs. Getting a faster graphics card is one of many ways to upgrade an old computer system. Thus, the eager user usually purchases another graphics card with an additional state-of-the-art graphics accelerator in his computer system for more powerful 3D graphics acceleration functions.

Referring to FIG. 3, in order to avoid interference with the external graphics adapter 4 having the state-of-the-art graphics accelerator 41, the whole embedded graphics adapter 7 in the integrated chip must be disabled when an external graphics adapter exists. The embedded graphics adapter 7 thus is wasted.

Therefore, it is demanding that the computer system capable of supporting coexistence of external graphics adapter with embedded graphics adapter. With dual graphics adapters, a computer user can expand their desktop, run different programs on separate displays, even play some applications with multiple views, and each display can have a different resolution and color depth.

SUMMARY OF THE INVENTION

In view of the above, an objective of the invention is to provide an apparatus for supporting coexistence of an external graphics adapter with an embedded graphics adapter.

It is another objective of the invention that the graphics memory of the embedded graphics adapter is integrated into DRAM of the computer system, and CPU and embedded graphics adapter utilize PCI transaction to access graphics memory of embedded graphics adapter.

It is another objective of the invention that the embedded graphics adapter could be an AGP device while the external graphics adapter would be a PCI device, and vice versa.

To achieve the above objectives, the apparatus for supporting multiple graphics adapters in a computer system according to the invention includes an embedded graphics adapter, a corelogic, an AGP bridge and a PCI bridge. The embedded graphics adapter has an AGP interface and a PCI interface. The corelogic has a memory controller signally-connected to the graphics memory of the embedded graphics adapter. The AGP bridge is signally-connected with the AGP interface and the memory controller; and the PCI bridge is signally-connected with the PCI interface and the memory controller.

When an external AGP graphics adapter exists in the computer system, the embedded graphics adapter transfers data to the memory controller via the PCI interface and the PCI bridge using PCI transactions. On the other hand, when an external PCI graphics adapter exists in the computer system, the embedded graphics adapter transfers data to the memory controller via the AGP interface and the AGP bridge using AGP transactions.

When no external graphics adapter exists in the computer system, the embedded graphics adapter may act as an AGP device and transfer data to the memory controller via the AGP interface and the AGP bridge using AGP transactions.

The graphics memory of the embedded graphics adapter may be integrated into the DRAM of the computer system. The corelogic is capable of remapping graphics address and direct accessing the graphics memory for supporting the embedded graphics adapter and the external graphics adapter, respectively.

The invention also provides a method for supporting multiple graphics adapters in a computer system. Firstly, the status of the AGP slot and the PCI slot in the computer system is detected when the system boots up. Then, a slot-status parameter is set according to the detect result, and the mode of the embedded graphics adapter is determined according to the slot-status parameter.

The detecting and the setting may be performed by the BIOS of the computer system. The checking may be performed by the embedded graphics adapter or the BIOS of the computer system.

Additional objectives and advantages of the invention will be set forth in the description that follows, and in part will be obvious from the description, or may be learned by practice of the invention. The objects and advantages of the present invention may be realized and obtained by means of the instrumentalities and combinations of particularly pointed out in the appended claims.

DETAILED DESCRIPTION OF THE PREFERRED EMBODIMENT

Figure 1:
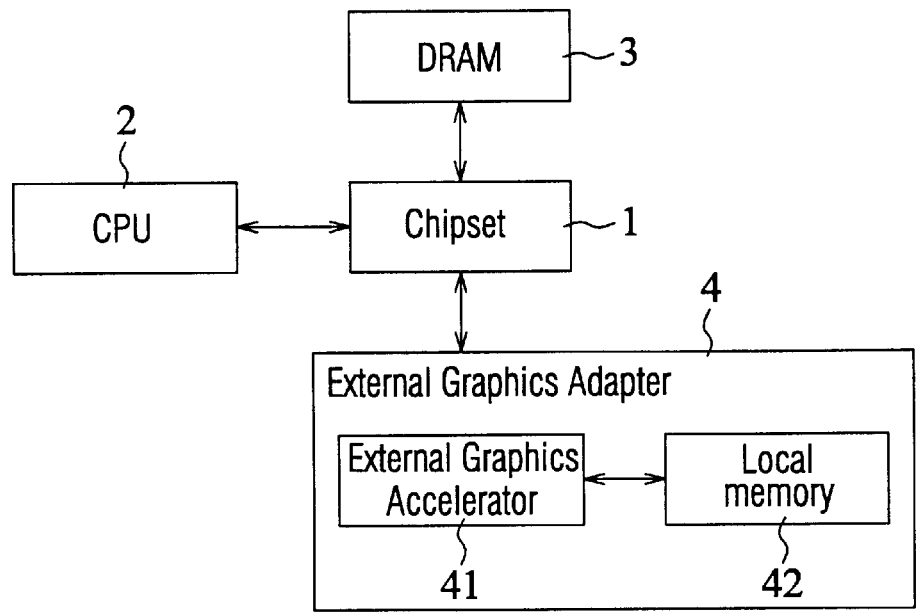
FIG. 1 is a block diagram showing a conventional graphics system with chipset and an AGP or PCI graphics adapter.
Figure 2:
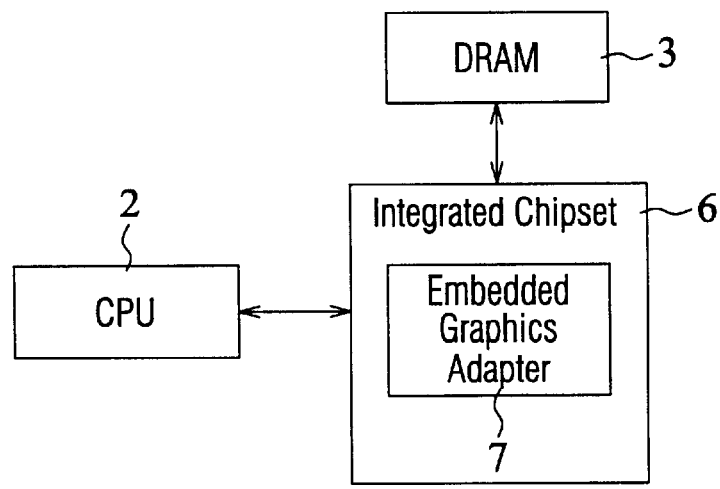
FIG. 2 is a block diagram showing a conventional graphics system with an integrated chipset comprising an embedded graphics adapter.
Figure 3:
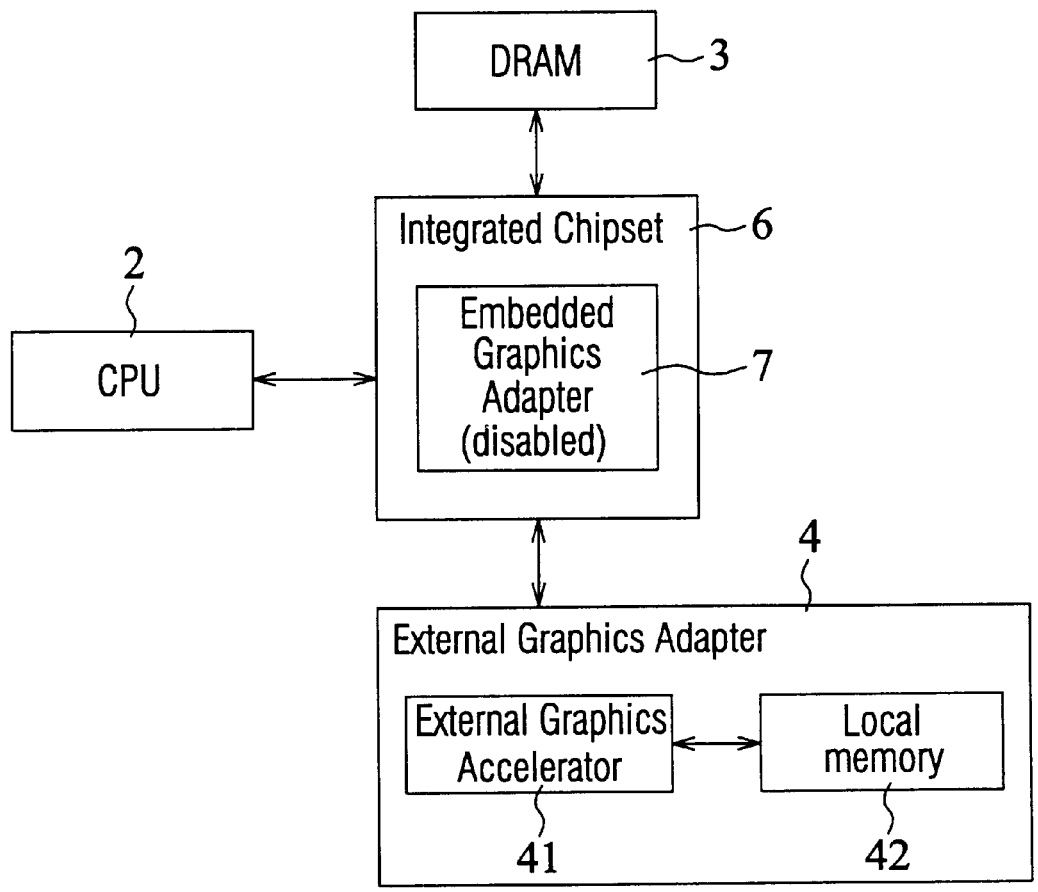
FIG. 3 is a block diagram showing a conventional graphics system with an integrated chipset comprising an embedded graphics adapter and an additional AGP or PCI graphics adapter.
Figure 4:
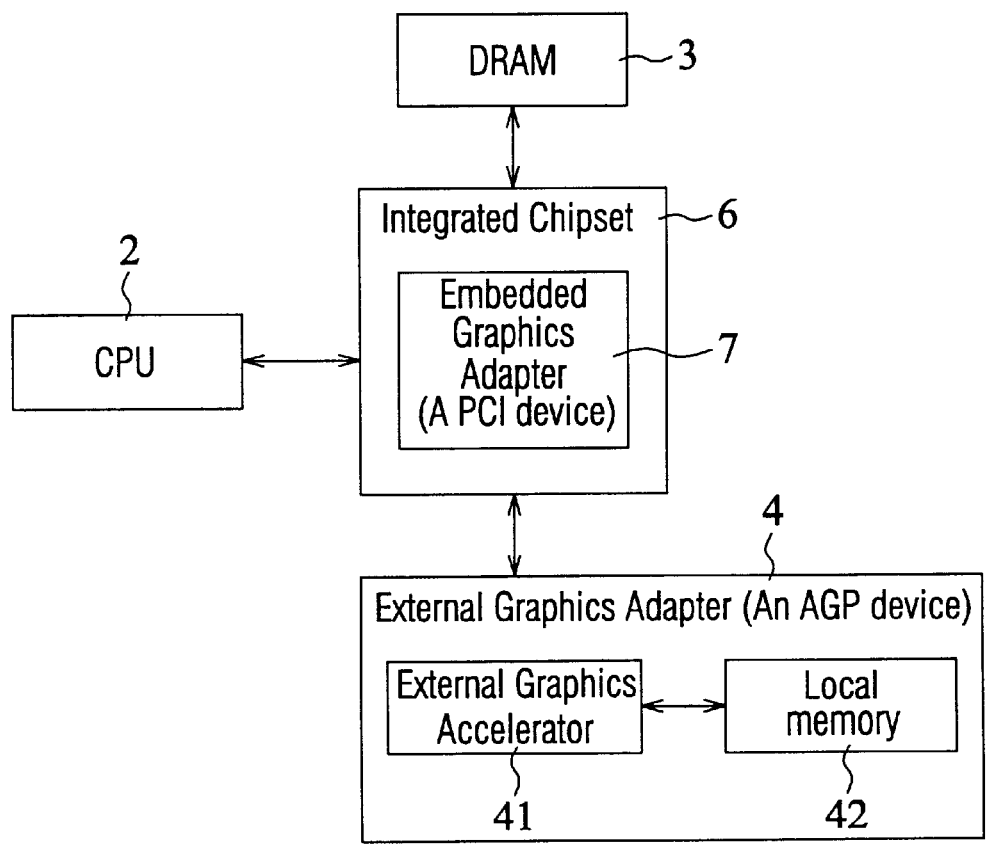
FIG. 4 is a block diagram showing a graphics system according to a preferred embodiment of the invention that is capable of supporting coexistence of external AGP graphics adapter with embedded graphics adapter.

FIG. 4 is a simplified block diagram showing the condition when the AGP slot receives an external graphics adapter 4. In the preferred embodiment, the embedded graphics adapter 7 is an AGP device when no external graphics adapter exists. When an external AGP graphics adapter 4 exists, the embedded graphics adapter 7 is switched to be a PCI graphics adapter. This solves the problem that the AGP specification does not allow two AGP graphics adapters exist in one computer system.

The external graphics adapter 4 has a contiguous view of graphics data structures dynamically allocated in DRAM 3. Remapping is accomplished using a memory-based table called the GART (Graphics Address Remapping Table) and is performed by the corelogic (not shown) in the integrated chipset 6. Segments of the DRAM 3 can be dynamically reserved for the graphics controller by the OS. This reserved memory segment is termed AGP memory or non-local graphics memory. This mechanism is specified at a software level.

Figure 5:
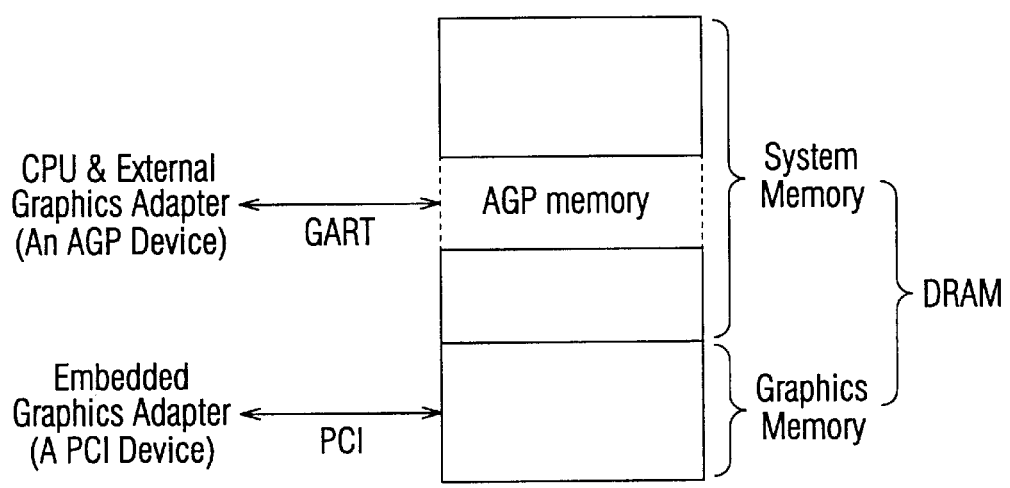
FIG. 5 is a schematic diagram showing the memory configuration according to the preferred embodiment of the invention.

The graphics memory of the embedded graphics adapter 7 is integrated into DRAM 3. Referring to FIG. 5, DRAM 3 is divided into two parts, system memory 31 and graphics memory 32 of the embedded graphics adapter 7. The AGP memory 311 is non-local and dynamically-allocated areas of the system memory 31, and it can be accessed by the external graphics adapter 4 quickly. The graphics memory 32 is dedicated and statically-allocated areas of DRAM 3, and it is regarded as local graphics memory of the embedded graphics adapter 7.

In dual graphics adapter mode, the behavior of embedded graphics adapter 7 is the same as a PCI graphics adapter except that the local graphics memory is allocated in DRAM 3. The embedded graphics adapter 7 can access the allocated graphics memory 32 via PCI transfer according to the PCI bus protocol. The CPU 2 accesses to the graphics memory 32 also via the PCI transfer. The data coherency is guaranteed by the corelogic of the integrated chipset 6 for all PCI transactions and it is consistent with normal PCI operation.

Figure 6:
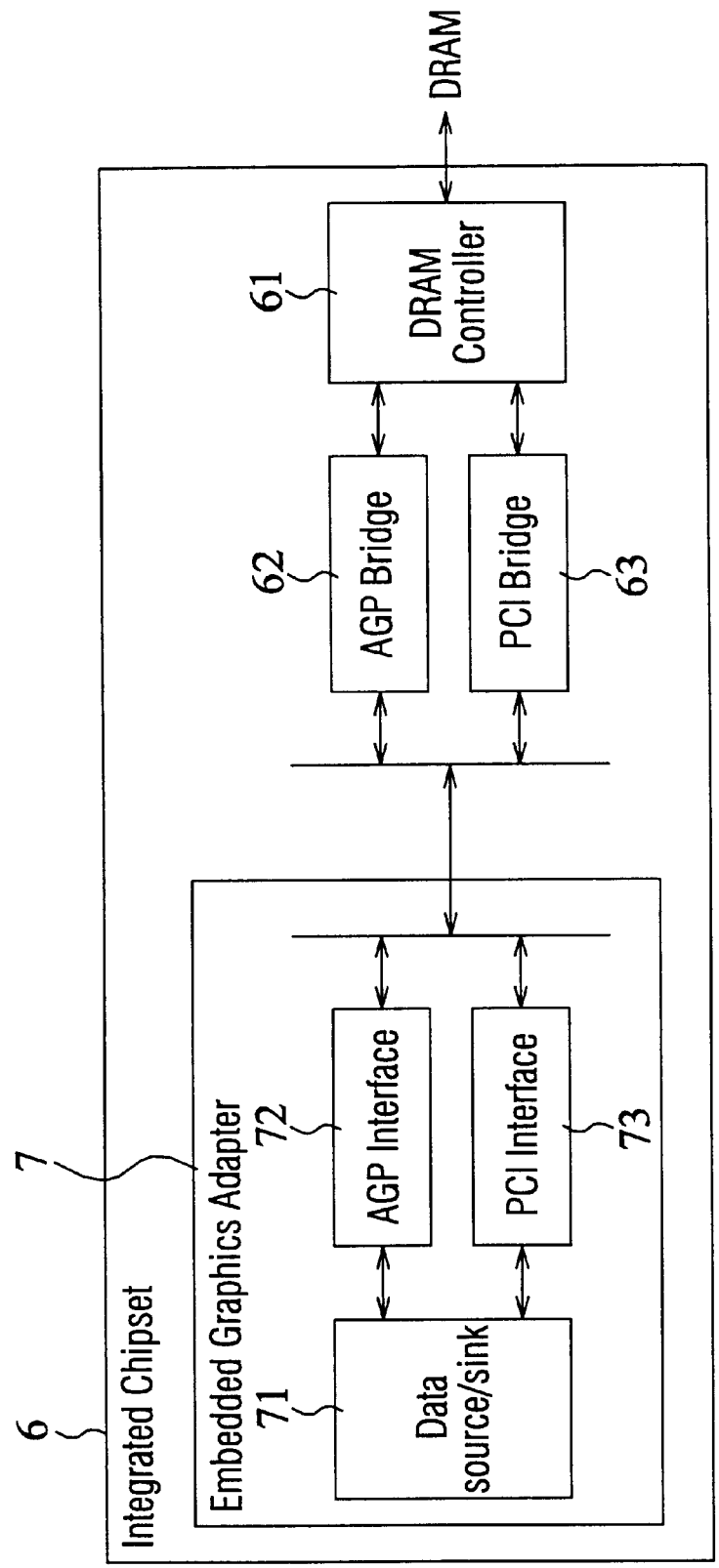
FIG. 6 is a block diagram showing the display device interface of the embedded graphics adapter according to the preferred embodiment of the invention.

FIG. 6 illustrates the display device interface of embedded graphics adapter 7. For supporting coexistence of the external graphics adapter 4 with the embedded graphics adapter 7, the embedded graphics adapter 7 can transfer data to DRAM 3 using either AGP transactions or PCI transactions. The embedded graphics adapter 7 has an AGP interface 72 and a PCI interface 73 and, correspondingly, the integrated chipset 6 has an AGP bridge 62 and a PCI bridge 63, which are signally-connected with DRAM controller 61.

When the embedded graphics adapter 7 is the only graphics adapter in the system, it can be regarded as an AGP graphics adapter. Data are transferred between the data source/sink 71 and DRAM 3 via AGP interface 72 and AGP bridge 62 using AGP transactions. In a dual graphics adapter mode, the embedded graphics adapter 7 is the same as a PCI graphics adapter. When transferring data between the data source/sink 71 and DRAM 3 under the dual graphics adapter mode, data are transmitted via PCI interface 73 and PCI bridge 63 using PCI transactions.

Figure 7:
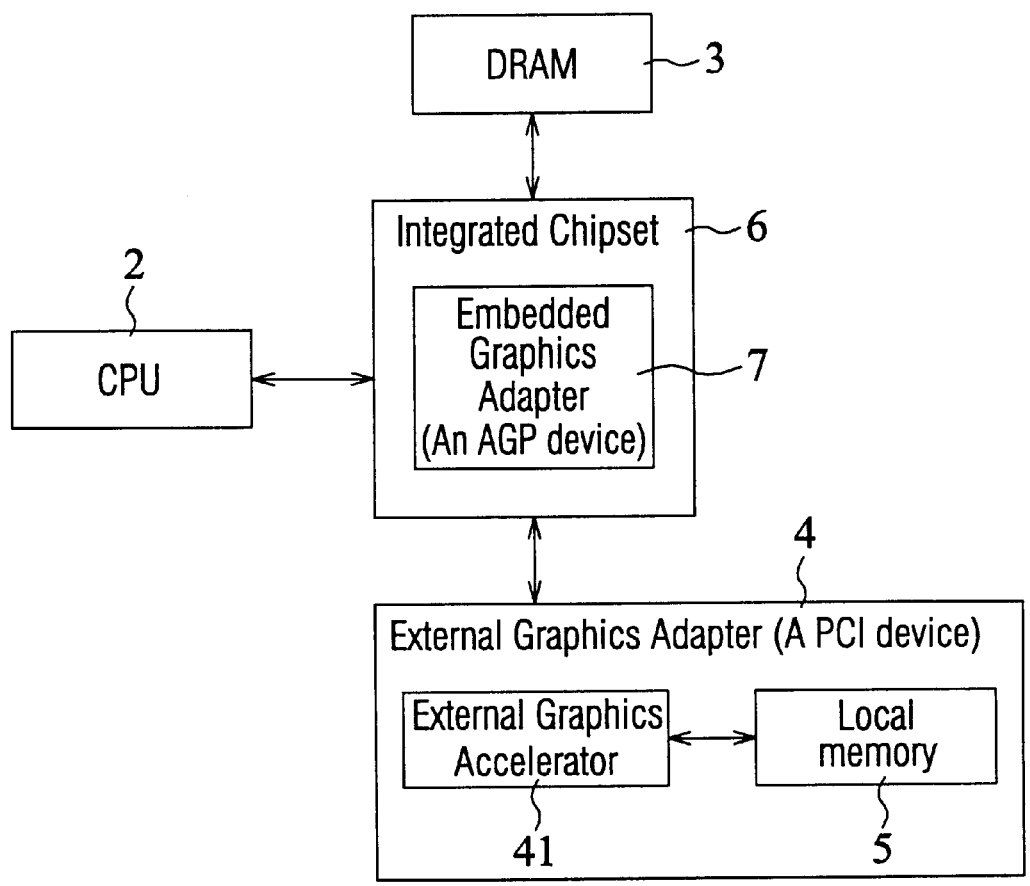
FIG. 7 is a block diagram showing a graphics system according to another preferred embodiment of the invention, wherein the external graphics adapter is a PCI device.

Note that the embedded graphics adapter 7 could also be an AGP device while the external graphics adapter would be a PCI device. FIG. 7 shows the graphics architecture of a computer system capable of supporting coexistence of an external graphics adapter 4, which is a PCI device, with an embedded graphics adapter, which is an AGP device. According to this embodiment, the embedded AGP graphics adapter 7 has a contiguous view of graphics data structures dynamically allocated in DRAM 3. Remapping is accomplished using the GART and is performed by the corelogic of the integrated chipset 6. Segments of the DRAM 3 can be dynamically reserved for the graphics controller by the OS. This reserved memory segment is termed AGP memory or non-local graphics memory.

Figure 8:
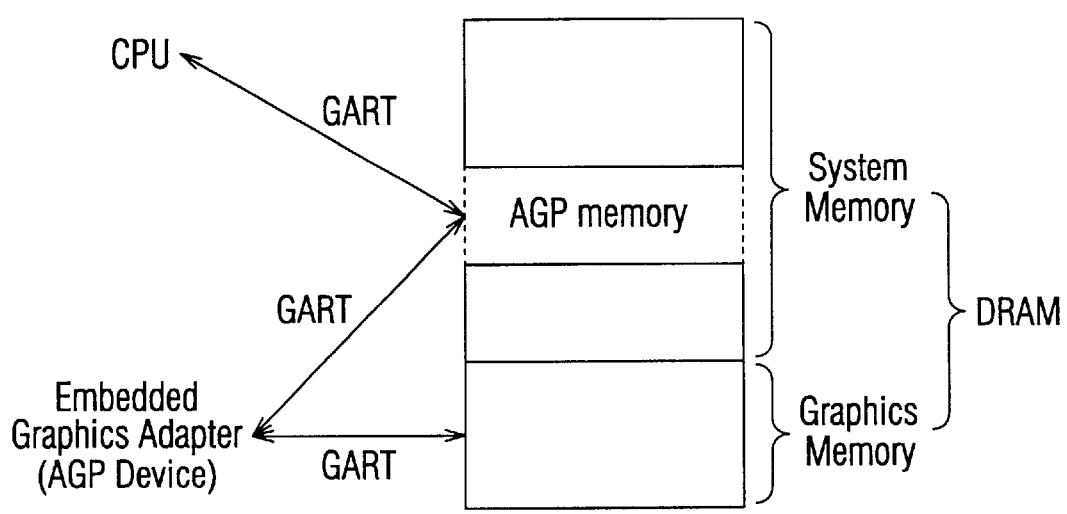
FIG. 8 is a schematic diagram showing the memory configuration according to another preferred embodiment of the invention.

FIG. 8 shows another memory configuration when the external graphics adapter is a PCI device. DRAM 3 is divided into two parts, system memory 31 and graphics memory 32 of the embedded graphics adapter 7. The termed AGP memory 311 is non-local and dynamically-allocated areas of system memory, and it can be accessed by the embedded AGP graphics adapter quickly. The graphics memory 32 is dedicated and statically-allocated areas of DRAM 3, and it is regarded as local graphics memory of the embedded graphics adapter 7. In dual graphics adapter mode, the behavior of embedded graphics adapter 7 is the same as an AGP graphics adapter except that the local graphics memory is allocated in the DRAM 3

Figure 9:
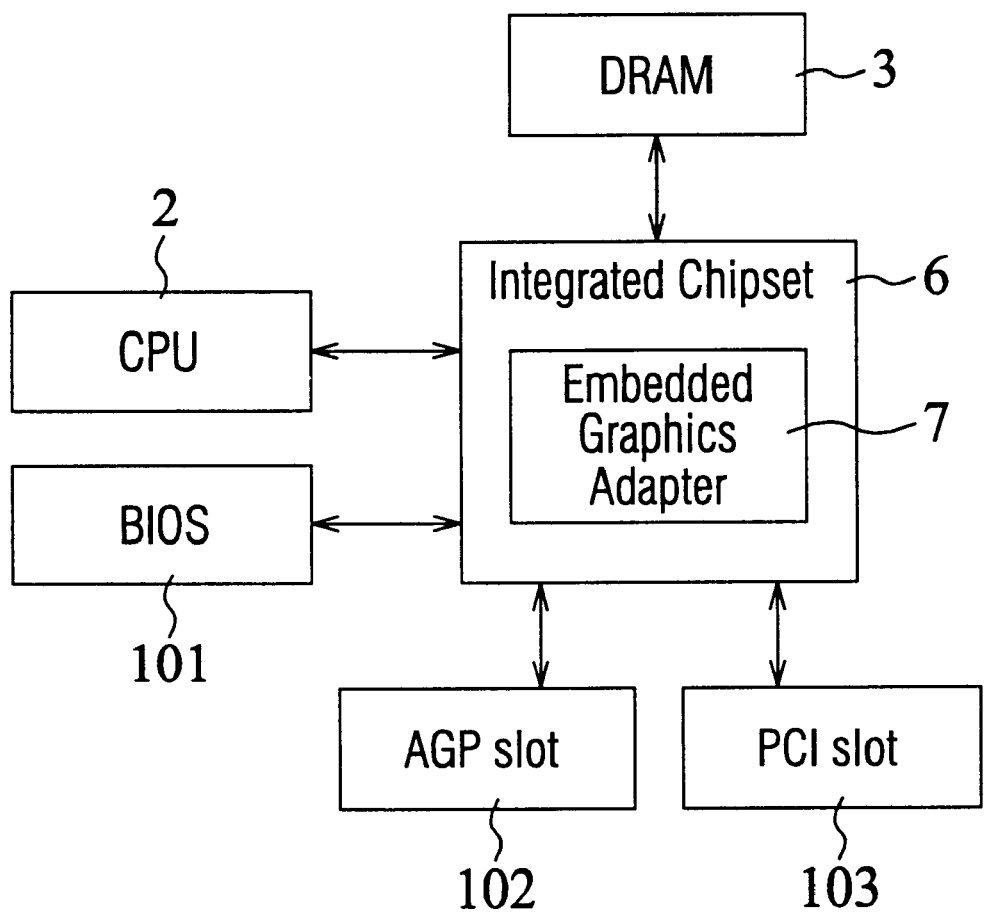
FIG. 9 is a block diagram showing the overall architecture of the computer system according to a preferred embodiment of the invention.

FIG. 9 shows the overall architecture of the computer system 10 according to the preferred embodiment of the invention. The computer system 10 is provided with the CPU 2, the DRAM 3, the integrated chipset 6 including the embedded graphics adapter 7, the BIOS 101, the AGP slot 102 and the PCI slot 103. The AGP slot 102 is capable of receiving an external AGP graphics adapter, and the PCI slot 103 is capable of receiving an external PCI graphics adapter.

Figure 10:
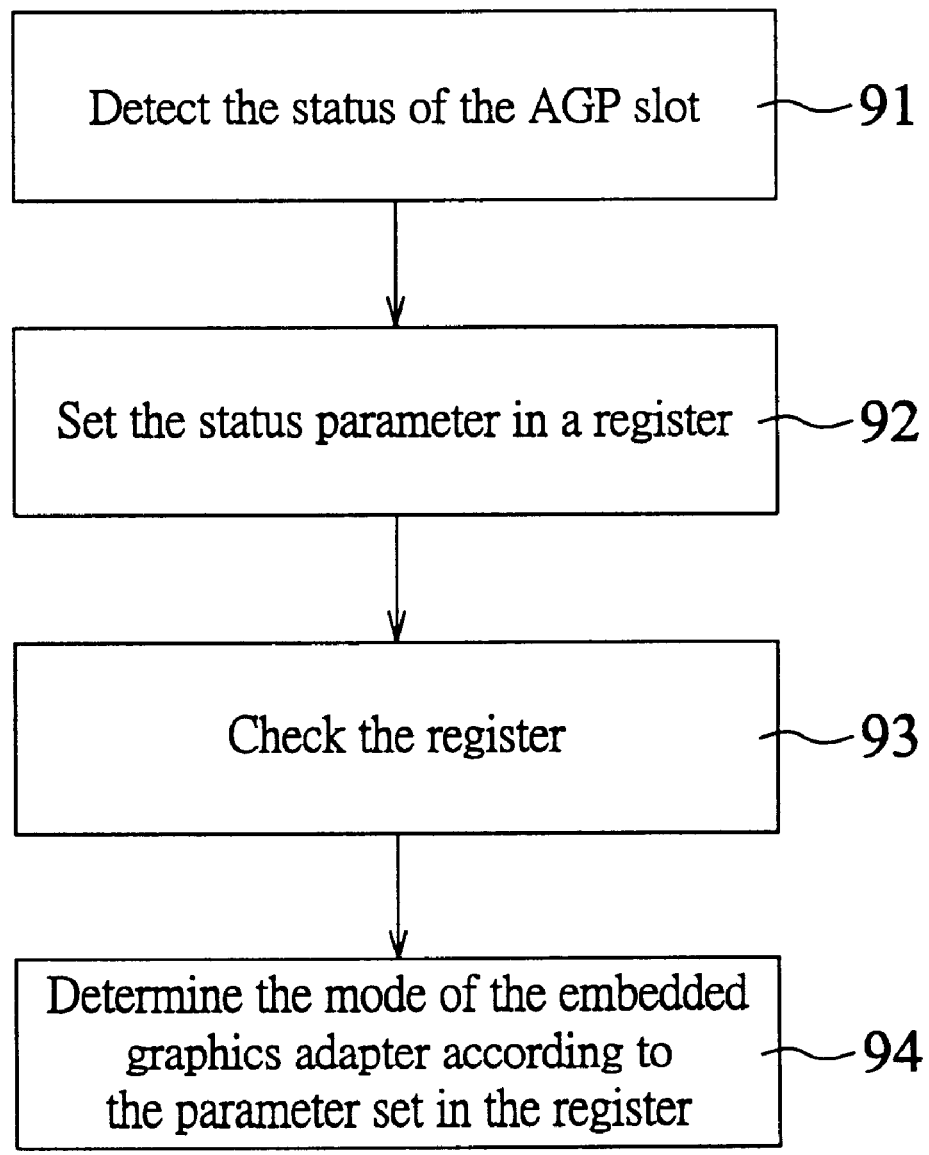
FIG. 10 is a flowchart showing the procedure of the method for supporting multiple graphics adapters according to the preferred embodiment of the invention.

Referring to FIG. 10, according to the preferred embodiment of the invention, when the computer system 10 shown in FIG. 9 boots up, the BIOS 101 checks the status of the computer system 10, including the status of the AGP slot 102 on the motherboard in step 91. Then, the BIOS sets a parameter in a register indicating the slot-status of the AGP slot 102 in step 92. For example, if the APG slot 102 is empty, then the parameter may is to 0. If an AGP graphics adapter appears in the AGP slot, then the parameter is set to 1.

The corelogic or the embedded graphics adapter then checks the register in step 93 to see if an external AGP graphics adapter exists in the computer system 10. The mode of the embedded graphics adapter 7 is then determined according to the parameter set in the register in step 94. For example, if the parameter is 0, then the embedded graphics adapter 7 acts as an AGP graphics adapter. If the parameter is 1, the embedded graphics adapter 7 switches to be a PCI graphics adapter after the computer system boots up. The slot-status parameter determines whether the embedded graphics adapter 7 be a PCI device or an AGP device.

Since the performance of an AGP device is better than a PCI device, the default status of the embedded graphics adapter 7 may be set as an AGP device.

Note that in the preferred embodiment, the BIOS 101 also checks the status of the PCI slot 103 on the motherboard. Once a PCI graphics adapter appears, the embedded graphics adapter 7 can also act as an AGP graphics adapter.

In summary, the invention provides an apparatus and a method for supporting coexistence of the external graphics adapter with embedded graphics adapter. The embedded graphics adapter can be regarded as a PCI device or a AGP device, and the graphics memory of embedded graphics adapter is integrated into DRAM of a computer system. The corelogic and software are capable of remapping graphics address and direct accessing graphics memory for supporting external graphics adapter and embedded graphics adapter, respectively.

According to the invention, the embedded graphics adapter switches its mode according to the type of the external graphics adapter. This makes the operation of whole computer system more flexible.

While the invention has been described in connection with what is presently considered to be the most practical and preferred embodiments, it is to be understood that the invention is not to be limited to the discovered embodiments. The invention is intended to cover various modifications and equivalent arrangement included within the spirit and scope of the appended claims.

What is claimed is:

1. An apparatus for supporting multiple graphics adapters in a computer system, comprising:
    an embedded graphics adapter having an AGP interface and a PCI interface;
    a corelogic having a memory controller signally-connected to a graphics memory of the embedded graphics adapter;
    an AGP bridge signally-connected with the AGP interface and the memory controller; and
    a PCI bridge signally-connected with the PCI interface and the memory controller,
    wherein when an external AGP graphics adapter exists in the computer system, the embedded graphics adapter transfers data to the memory controller via the PCI interface and the PCI bridge using PCI transactions, and
    wherein when an external PCI graphics adapter exists in the computer system, the embedded graphics adapter transfers data to the memory controller via the AGP interface and the AGP bridge using AGP transactions.

2. The apparatus according to claim 1, wherein when no external graphics adapter exists in the computer system, the embedded graphics adapter transfers data to the memory controller via the AGP interface and the AGP bridge using AGP transactions.

3. The apparatus according to claim 1, wherein the corelogic accomplishes remapping using a GART.

4. The apparatus according to claim 1, wherein the computer system comprises a DRAM, and the memory controller is a DRAM controller.

5. The apparatus according to claim 4, wherein the graphics memory of the embedded graphics adapter is integrated into the DRAM.

6. The apparatus according to claim 4, wherein the corelogic is capable of remapping graphics address and direct accessing the graphics memory integrated in the DRAM for supporting the embedded graphics adapter and one of the external AGP graphics adapter and the external PCI graphics adapter, respectively.

7. A computer system, comprising:
    a motherboard;
    an integrated chipset provided on the motherboard, including
        a corelogic having a memory controller;
        an embedded graphics adapter having an AGP interface and a PCI interface,
        an AGP bridge signally-connected with the AGP interface and the memory controller, and
        a PCI bridge signally-connected with the PCI interface and the memory controller;
    a DRAM provided on the motherboard and signally-connected with the memory controller; and
    wherein when an external AGP graphics adapter appears in the computer system, the embedded graphics adapter transfers data to the memory controller via the PCI interface and the PCI bridge using PCI transactions,
    wherein when an external PCI graphics adapter exists in the computer system, the embedded graphics adapter transfers data to the memory controller via the AGP interface and the AGP bridge using AGP transactions.

8. The computer system according to claim 7, wherein when no external graphics adapter exists in the computer system, the embedded graphics adapter transfers data to the memory controller via the AGP interface and the AGP bridge using AGP transactions.

9. The computer system according to claim 7, wherein the graphics memory of the embedded graphics adapter is integrated into the DRAM.

10. The computer system according to claim 7, wherein the corelogic accomplishes remapping using a GART.

11. The computer system according to claim 7, wherein the corelogic is capable of remapping graphics address and direct accessing the graphics memory integrated in the DRAM for supporting the embedded graphics adapter and one of the external AGP graphics adapter and the external PCI graphics adapter, respectively.

12. The computer system according to claim 7, further comprising:
    an AGP slot provided on the motherboard being capable of receiving the external AGP graphics adapter;
    a PCI slot provided on the motherboard being capable of receiving the external PCI graphics adapter; and
    a BIOS provided on the motherboard for detecting the occupancy status of the AGP slot and the PCI slot and setting a slot-status parameter to determine whether the embedded graphics adapter be an AGP device or a PCI device.

13. The computer system according to claim 12, further comprising:
    a register for storing the slot-status parameter.

14. A method for supporting multiple graphics adapters in a computer system, the computer system having an embedded graphics adapter integrated in an integrated chipset, the method comprising:

detecting the occupancy status of an AGP slot capable of receiving an external AGP graphics adapter and the PCI slot capable of receiving an external PCI graphics adapter in the computer system;

setting a slot-status parameter; and checking the slot-status parameter to determine whether the embedded graphics adapter should be an AGP device or a PCI device.

15. The method according to claim 14, wherein the checking is performed by the embedded graphics adapter.

16. The method according to claim 14, wherein the checking is performed by a corelogic integrated in the integrated chipset.

17. The method according to claim 14, wherein the detecting and the setting are performed by the BIOS of the computer system.

* * * * *